US008365530B2

(12) United States Patent
Zhang et al.

(10) Patent No.: US 8,365,530 B2
(45) Date of Patent: Feb. 5, 2013

(54) SYSTEM FOR CONDITIONING THE AIRFLOW ENTERING A TURBOMACHINE

(75) Inventors: Jianmin Zhang, Greer, SC (US); Douglas S. Byrd, Greer, SC (US); James P. Tomey, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 917 days.

(21) Appl. No.: 12/477,535

(22) Filed: Jun. 3, 2009

(65) Prior Publication Data

US 2010/0307164 A1 Dec. 9, 2010

(51) Int. Cl.
| F02C 1/00 | (2006.01) |
| F02C 7/00 | (2006.01) |
| F02C 9/00 | (2006.01) |
| F02G 3/00 | (2006.01) |
| F02G 1/00 | (2006.01) |

(52) U.S. Cl. ............ 60/728; 60/39.53; 60/39.3; 60/775
(58) Field of Classification Search ................ 60/728, 60/39.53, 39.3, 775
See application file for complete search history.

(56) References Cited

U.S. PATENT DOCUMENTS

| 5,193,352 | A | | 3/1993 | Smith et al. |
| 5,203,161 | A | | 4/1993 | Lehto |
| 5,390,505 | A | | 2/1995 | Smith et al. |
| 5,867,977 | A | * | 2/1999 | Zachary et al. ............... 60/39.53 |
| 6,119,445 | A | * | 9/2000 | Bronicki et al. ................ 60/772 |
| 6,250,064 | B1 | | 6/2001 | Tomlinson et al. |
| 6,256,976 | B1 | * | 7/2001 | Kataoka et al. ................. 60/775 |
| 6,318,065 | B1 | | 11/2001 | Pierson |
| 6,318,089 | B1 | | 11/2001 | Hiraga et al. |
| 6,634,165 | B2 | * | 10/2003 | Tomlinson et al. ............ 60/39.3 |
| 7,343,746 | B2 | | 3/2008 | Pierson |
| 8,196,907 | B2 | * | 6/2012 | Zhang et al. ................... 261/116 |
| 2004/0103667 | A1 | * | 6/2004 | Frutschi .......................... 60/775 |
| 2004/0163536 | A1 | * | 8/2004 | Baudat et al. ................... 95/214 |
| 2007/0059159 | A1 | * | 3/2007 | Hjerpe .......................... 415/117 |
| 2007/0294984 | A1 | * | 12/2007 | Chillar et al. ................... 55/314 |
| 2008/0098890 | A1 | * | 5/2008 | Feher .............................. 95/187 |

FOREIGN PATENT DOCUMENTS

EP 0350272 B1 5/1996

* cited by examiner

*Primary Examiner* — William H Rodriguez
*Assistant Examiner* — Carlos A Rivera
(74) *Attorney, Agent, or Firm* — Cantor Colburn LLP

(57) ABSTRACT

A system for conditioning an airstream entering an air-breathing machine includes an air conditioning system (ACS) configured for adjusting a physical property of the airstream, wherein the ACS comprises a module. The module includes a non-media conditioning system configured for adjusting a physical property of the airstream if an ambient condition is within a range, wherein the non-media conditioning system comprises nozzles adapted for spraying a fluid onto the airstream. The module also includes a media conditioning system configured for adjusting a physical property of the airstream to provide additional output of the air-breathing machine, wherein the media conditioning system comprises a direct exchange medium and a fluid distribution manifold. The ACS operates in a direct evaporative mode if the fluid is approximately greater than a dew point temperature and operates in a direct chilling mode if the fluid is approximately less than a dew point temperature.

18 Claims, 3 Drawing Sheets

SYSTEM FOR CONDITIONING THE AIRFLOW ENTERING A TURBOMACHINE

BACKGROUND OF THE INVENTION

The present invention relates generally to an airstream entering an air-breathing machine; and more particularly to a system for conditioning the airstream entering the inlet system of the air-breathing machine.

Air-breathing machines generate and/or transform the energy used in a wide variety of applications. These machines may have the form of: a heat exchanger; an air-breathing turbomachine, such as, but not limiting of, a gas turbine, an aircraft engine, an aero-derivative engine; or the like. Although, the following discussion primarily focuses on gas turbines, the concepts discussed are not limited to gas turbines.

A gas turbine typically includes: an inlet system, a compressor section, a combustion section, a turbine section, and an exhaust section. A gas turbine may operate as follows. The inlet system receives the airstream from the ambient environment of the gas turbine. Next, the compressor section compresses the airstream. Next, the compressed airstream flows to the combustion section where fuel mixing may occur, prior to combustion. Next, the combustion process generates a gaseous mixture that drives the turbine section. Next, the turbine section converts the energy of the gaseous mixture to the mechanical energy in the form of torque. Next, the torque is customarily used to drive an electrical generator, a mechanical drive, or the like.

Gas turbine performance is commonly determined by the output, thermal efficiency, and/or heat rate. The temperature and humidity of the incoming airstream have a significant impact on the gas turbine performance. Generally, the gas turbine become less efficient as the temperature of the airstream increases.

Various systems have been utilized to reduce the inlet airstream temperature. The primary goal of these systems is to increase gas turbine performance during ambient conditions that have higher airstream temperatures and/or humidity. These systems attempt to achieve this goal by conditioning the airstream prior to entering the compressor section. Conditioning may be considered the process of adjusting at least one physical property of the airstream. The physical property may include, but is not limited to: a wet-bulb temperature, a dry-bulb temperature, humidity, and density. The effect of adjusting the physical property of the airstream should be to improve the performance of the gas turbine.

Some known examples of these systems include: evaporative coolers, mechanical chillers, absorption chillers, thermal energy systems, and the like. These systems may be installed at various locations around the gas turbine.

There are a few concerns with known systems for conditioning the airstream entering a gas turbine. The benefits associated with the known systems do not justify the economic costs associated with the installation. The use of an evaporative cooling system may be limited in areas where hot and humid conditions are prominent. Known chilling systems require a coil, which significantly adds to the cost of the chilling system. Some known gas turbine powerplants incorporate both evaporative cooling system and chilling systems. Here, the separate structures of these systems require additional installation time, space near the gas turbine, and also increase operation and maintenance cost.

For the foregoing reasons, there may be a desire for a new and improved system for conditioning the inlet airstream. The system should allow for greater operability in hot and humid areas, while also operating efficiently in hot and dry areas. The system should provide a single structure that can provide evaporative cooling and chilling capabilities. The system should also provide a chilling system that does not require a coil.

BRIEF DESCRIPTION OF THE INVENTION

In an embodiment of the present invention, a system for conditioning an airstream entering an air-breathing machine, the system comprising: an air conditioning system (ACS) configured for adjusting a physical property of an airstream entering an air-breathing machine, wherein the air conditioning system comprises a module, and wherein the module comprises: a non-media conditioning system configured for adjusting a physical property of the airstream if an ambient condition is within a range; wherein the non-media conditioning system comprises: nozzles adapted for spraying a fluid onto the airstream; and a media conditioning system configured for adjusting a physical property of the airstream if additional output of the air-breathing machine is desired; wherein the media conditioning system comprises: nozzles adapted for spraying a fluid onto the airstream; a direct exchange medium, and a fluid distribution manifold; wherein an operating mode of the air conditioning system comprises at least one: a direct evaporative mode, wherein a first conditioning circuit supplies the fluid that flows through the nozzles and the fluid that flows through the fluid distribution manifold, the fluid distribution pad, and the direct exchange medium, wherein the fluid engages the airstream flowing through ACS; a direct chilling mode, wherein a second conditioning circuit supplies the fluid that flows through the nozzles and the fluid that flows through the fluid distribution manifold, the fluid distribution pad, and the direct exchange medium, wherein the fluid engages the airstream flowing through the ACS; and wherein if the fluid supplied to the non-media conditioning system and to the media conditioning system is approximately greater than the dew point temperature, then the ACS operates in the direct evaporative mode; and wherein if the fluid supplied to the non-media conditioning system and to the media conditioning system is approximately less than the dew point temperature, then the ACS operates in the direct chilling mode.

In an alternate embodiment of the present invention, a system for increasing an output of an energy producing facility comprising an air-breathing machine, the system comprising: a gas turbine comprising an inlet system, wherein the inlet system comprises at least one of: a weather hood, an inlet filter house, a transition piece, an inlet duct, and an inlet bleed heat section: and an air conditioning system (ACS) configured for adjusting a physical property of an airstream entering the gas turbine, wherein the air conditioning system comprises a plurality of modules, and wherein each module comprises: a non-media conditioning system configured for adjusting a physical property of the airstream if an ambient condition is within a range; wherein the non-media conditioning system comprises nozzles configured for spraying a fluid onto the airstream; and a media conditioning system configured for adjusting a physical property of the airstream if additional output of the air-breathing machine is desired; wherein the media conditioning system comprises: a direct exchange medium, and a fluid distribution manifold.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

FIG. 1 is a schematic illustrating an environment where an embodiment of the present invention may operate.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology may be used herein for convenience only and is not to be taken as a limitation on the invention. For example, words such as "above", "below", "top", "bottom", "upper", "lower", "left", "front", "right", "horizontal", "vertical", "upstream", "downstream", "fore", and "aft" merely describe the configuration shown in the Figures. Indeed, the components may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features.

An embodiment of the present invention provides an air conditioning system (ACS) for conditioning the airstream entering an air-breathing machine, such as, but not limiting of, a gas turbine. As discussed, conditioning may be considered a process that adjusts at least one physical property of the airstream. The physical property may comprise: a wet-bulb temperature, a dry-bulb temperature, relative humidity, density, or the like. In an embodiment of the present invention, the major components of the ACS may be located in a single structure, which may be considered a module. Depending on the application of the ACS, multiple modules may be physically and/or operationally integrated on the air-breathing machine. The discussion below focuses on a non-limiting embodiment of the ACS integrated with a gas turbine.

Figure 2:
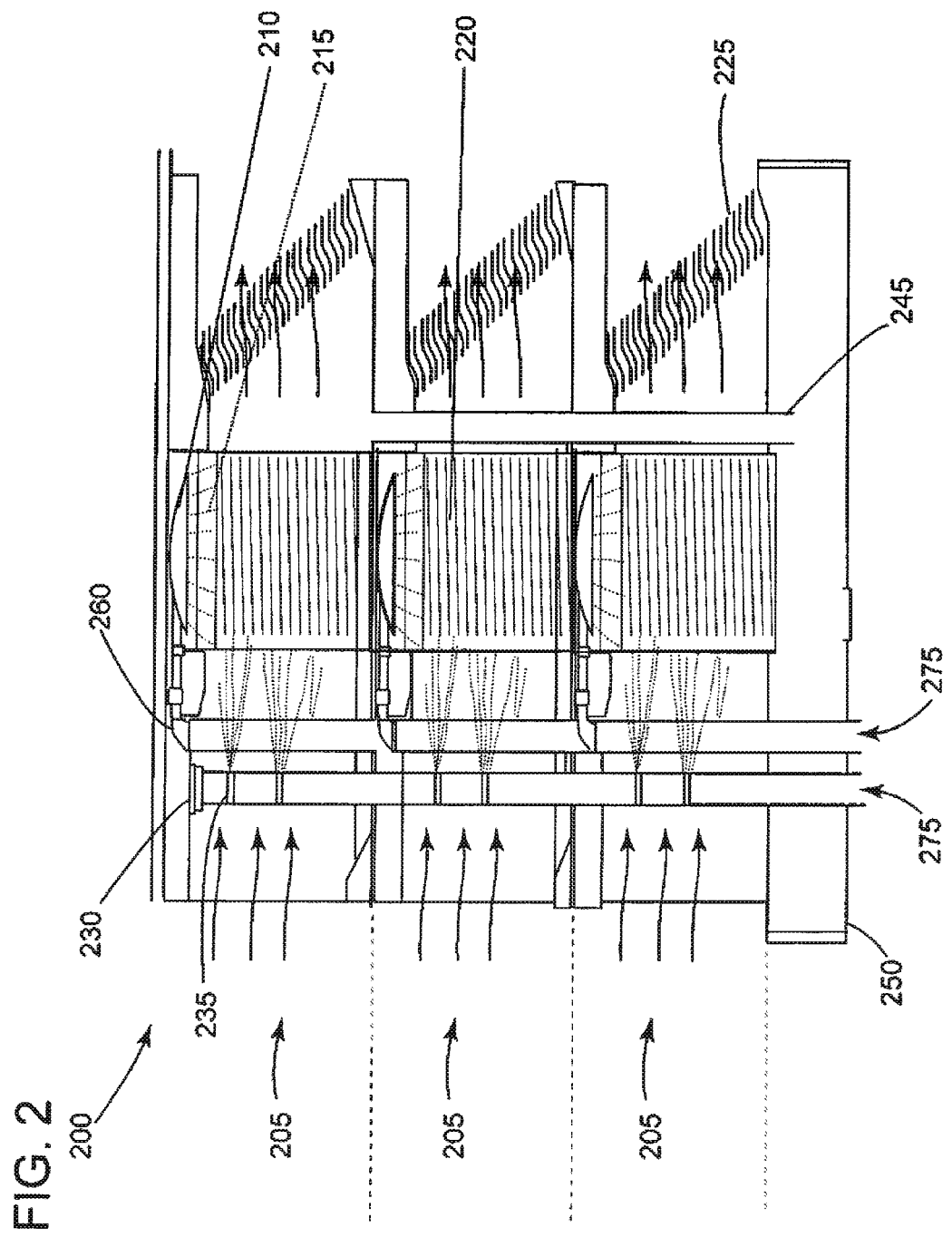
FIG. 2 is a schematic illustrating an elevation view of modules of an air conditioning system, in accordance with an embodiment of the present invention.
Figure 3:
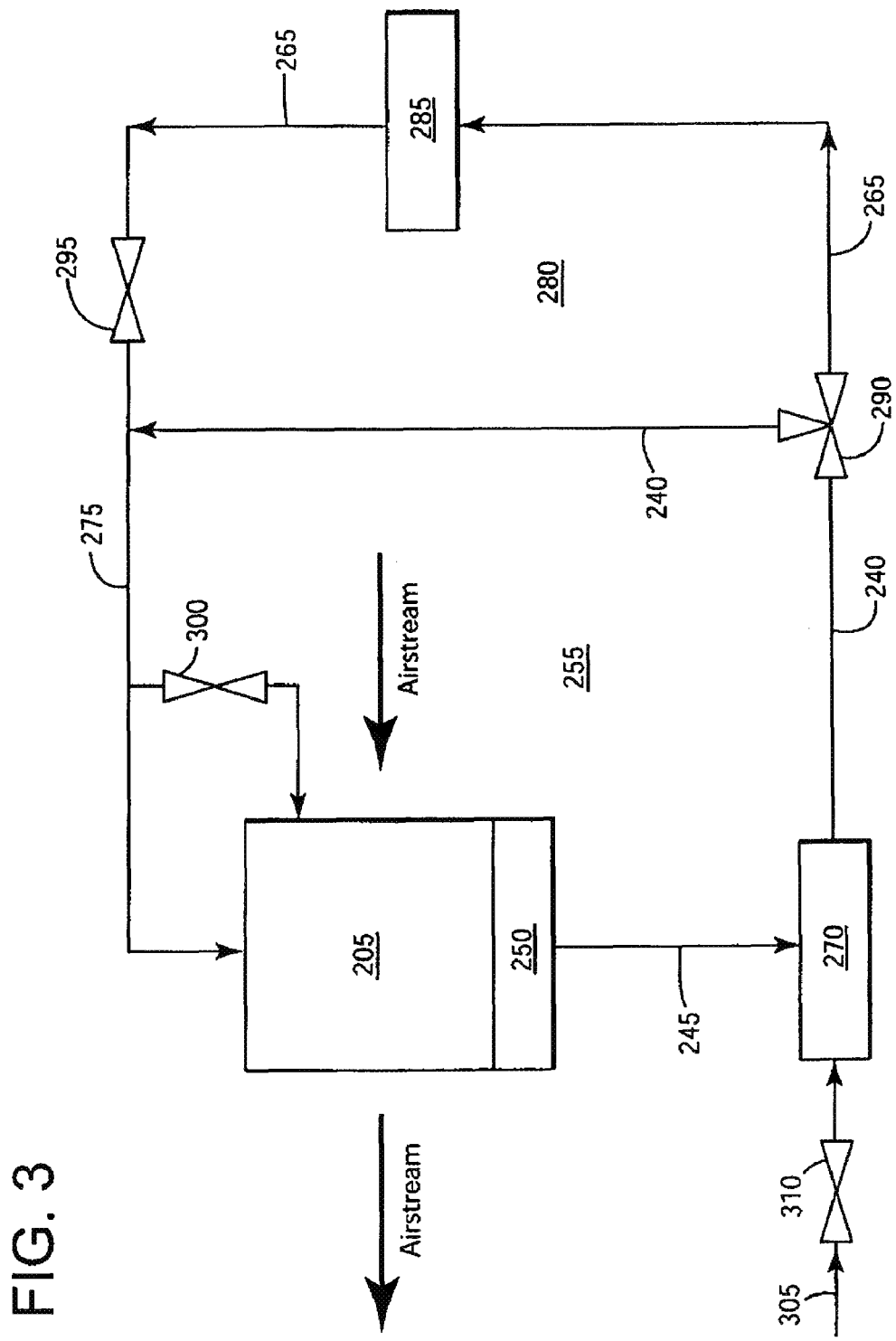
FIG. 3 is a schematic illustrating a schematic of an air conditioning system, in accordance with an embodiment of the present invention.

An embodiment of the present invention may provide an ACS comprising a non-media conditioning system and a media conditioning system, each of which are illustrated in FIGS. 2 and 3. An embodiment of the ACS may provide the flexibility of operating in either an evaporative system mode or a chilling system mode. Here, if the fluids supplied to the non-media conditioning system and to the media conditioning system are greater than the dew point temperature, then the ACS may function as an evaporative system. Similarly, if the fluids supplied to the non-media conditioning system and to the media conditioning system are less than the dew point temperature, then the ACS may function as a chilling system.

Figure 1:
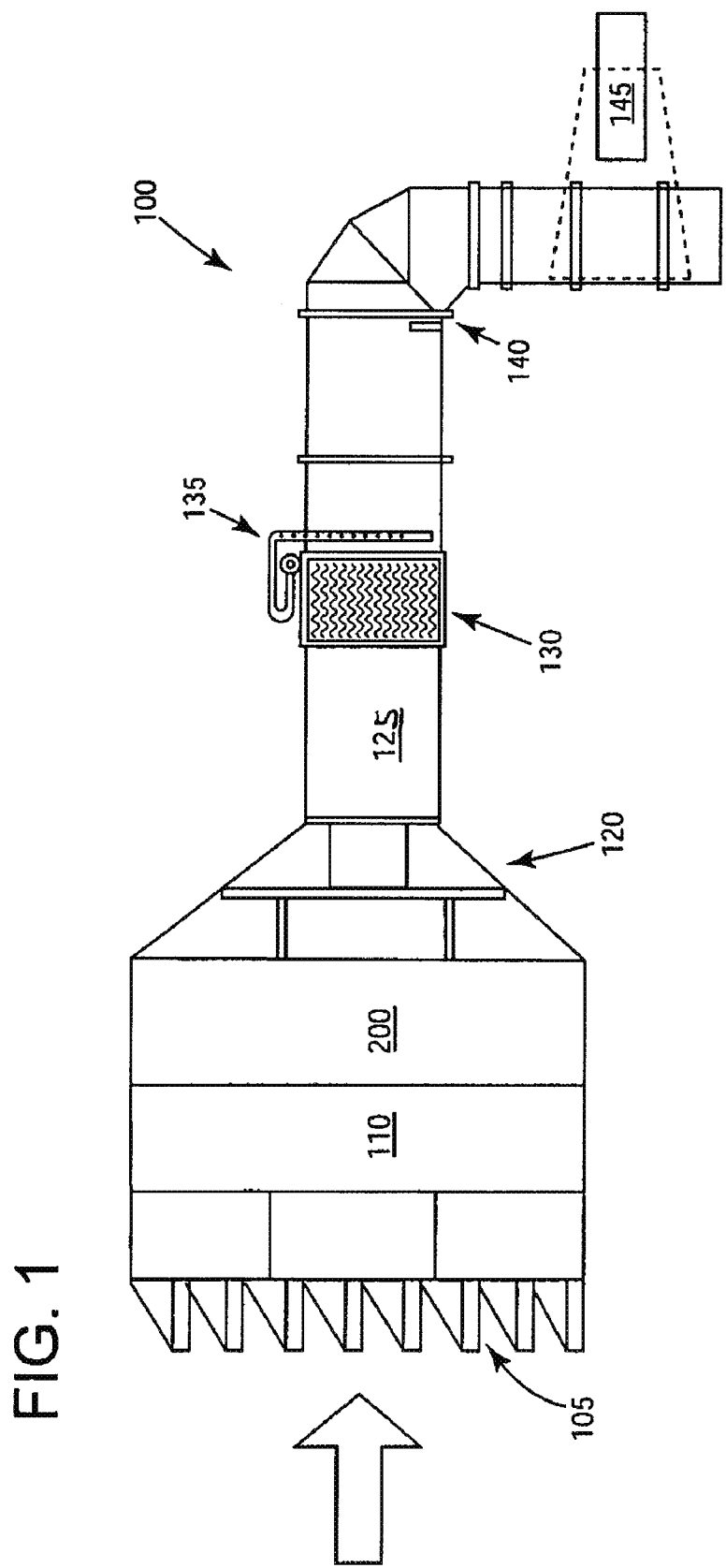

Referring now to the Figures, where the various numbers represent like elements throughout the several views, FIG. 1 is a schematic illustrating an environment where an embodiment of the present invention may operate. FIG. 1 illustrates an inlet system 100 that is typically integrated with a compressor 145 of a gas turbine. The following description provides an overview of a typical configuration of an inlet system 100. The present invention may be used with other configurations of the inlet system 100, which are not illustrated in the Figures.

The inlet system 100 channels the airstream, represented as large arrow(s) throughout the Figures, drawn in by the compressor 145. The airstream usually comes from the environment in which the gas turbine operates. Initially, the airstream flows around a weather hood 105, which may prevent weather elements, such as rain, snow, hail, or the like, from entering the compressor 145. The airstream may then flow through an inlet filter house 110; which generally removes foreign objects and debris from the airstream. Next, the airstream may flow through the ACS 200, which may condition a physical property of the airstream. Next, the airstream may flow through a transition piece 120 and an inlet duct 125; these components may adjust the velocity and pressure of the airstream. Next, the airstream may flow through a silencer section 130. Next, the airstream may flow through an inlet bleed heat system 135, which, when used, increases the airstream temperature prior to entering the compressor 145. A trash screen 140, or the like, may be located downstream of the inlet duct 125 and generally may prevent debris from entering the compressor 145.

FIG. 2 is a schematic illustrating an elevation view of modules 205 of an air conditioning system 200, in accordance with an embodiment of the present invention. FIG. 2 illustrates that an embodiment of the present invention has major components of the air conditioning system 200 with a module 205. FIG. 2 also illustrates how an embodiment of the present invention allows for the integration of multiple modules 205, all of which may be housed within an inlet system 100. Three (3) similar modules 205 are illustrated in FIG. 3 in a stacked configuration. For the convenience of the reader, the use of redundant component/element numbers has been limited. For example, but not limiting of, component/element number 210, which represents a fluid distribution manifold, is only shown on the top module 205. The bottom two modules 205 also have the same fluid distribution manifold 205, as illustrated in FIG. 2.

In an embodiment of the present invention, the major components of the ACS 200 may be located within the module 205. These may include components of the non-media conditioning system 230, the media conditioning system 260, and a mist eliminator 225. Operationally, the modules 205 may receive a fluid, such as, but not limiting of, water, a coolant, or combinations thereof, from a header 275. The header 275 may receive the fluid from the non-chilled fluid supply 240, or the chilled fluid supply 265, depending on the operational mode of the ACS 200. The header 275 may then discharge the fluid directly to the third valve 300 and/or to the module 205.

An embodiment of the non-media conditioning system 230 may provide spray nozzles 235 (schematically illustrated in FIG. 2). The spray nozzles 235 may serve to precondition the airstream prior to engaging the media conditioning system 260. The preconditioning attempts to establish a nearly uniform temperature profile of the airstream exiting the direct exchange medium 220. The spray nozzles 235 may create fluid droplets of a size that may substantially evaporate prior to the airstream entering an inlet to the compressor 145. In an embodiment of the present invention, the spray nozzles 235 may have a nozzle size of from about 0.1 inches to about 0.25 inches. Here, a fluid system pressure may comprise less than about 150 pounds per square inch.

The components of the media conditioning system 260 housed in an embodiment of the module 205 may include: a fluid distribution manifold 210; a fluid distribution pad 215; a direct exchange medium 220; and a chilled fluid supply 265. The fluid distribution manifold 210 may be positioned above the direct exchange medium 220 and receive the fluid from the chilled fluid supply 265. The fluid distribution manifold 210 may have the form of a multi-nozzle structure, similar to a showerhead, or the like.

The direct exchange medium 220 generally functions as a heat exchanger that utilizes the fluid to adjust a physical property, such as, but not limiting of, the dry-bulb temperature, of the airstream. Essentially, an embodiment of the direct exchange medium 220 allows for the fluid to directly contact the flowing airstream. The cooler temperature of the fluid may lower the dry-bulb temperature, and/or adjust another physical property of the airstream.

An embodiment of the direct exchange medium 220 may comprise the form of a media-type of heat exchanger. This form of direct exchange medium 220 generally provides a direct contact heat transfer process, which may minimize the heat transfer resistance compared to a coil-type of heat exchanger. Furthermore, this embodiment of the direct exchange medium 220 may be created from a corrugated cross-fluted material, such as, but not limiting of, a nylon, a plastic, a carbon fiber, a cellulose material, a synthetic polymer, a metal, or combinations thereof. This benefit may avoid the need for relatively expensive copper tubing and aluminum fins, which are commonly used to form a coil-type of heat exchanger. This embodiment of the direct exchange medium 220 may reduce the amount and type of material used for forming the heat transfer surface areas, which may result in a significant cost and weight reduction.

An alternate embodiment of the media conditioning system 260 may comprise a fluid distribution pad 215. Here, the fluid distribution manifold 210 distributes the fluid across the fluid distribution pad 215. The fluid distribution pad 215 serves to deliver the fluid to the direct exchange medium 220. This may aid in ensuring that the fluid adequately wets the direct exchange medium 220. As illustrated in FIG. 2, the fluid distribution pad 215 may be positioned below the fluid distribution manifold 210 and above the direct exchange medium 220.

An embodiment of the fluid distribution pad 215 may comprise various sized flow restrictions to direct the airstream over the direct exchange medium 220. This feature may allow for optimizing a flowrate associated with the fluid distribution pad 215. For example, but not liming of, an application of the ACS 200 may require more fluid in a first half of the direct exchange medium 220. Here, the fluid distribution pad 215 may comprise larger holes in the section that delivers the fluid to the first half of the direct exchange medium 220 than the holes in the section that delivers the fluid to the second half of the direct exchange medium 220.

The module 205 may also comprise a mist eliminator 225. The mist eliminator 225 generally serves to remove some of the fluid that may be entrained in the airstream due to operation of the non-media conditioning system 230 and/or the media conditioning system 260. As illustrated in FIG. 2, an embodiment of the module 205 places the mist eliminator 225 downstream of the non-media conditioning system 230 and the media conditioning system 260.

FIG. 2 also illustrates how multiple modules 205 of an ACS 200 may be integrated within a single inlet system 100. FIG. 2 illustrates how three (3) independent non-media conditioning systems 230 may have a common supply of non-chilled fluid from the header 275 and a common collection tank 250. FIG. 2 also illustrates how three (3) independent media conditioning systems 260 may also have a common supply of chilled fluid from the header 275, fluid return 245, and all share a collection tank 250 with the non-media conditioning systems 230.

FIG. 3 is a schematic illustrating a schematic of an air conditioning system 200, in accordance with an embodiment of the present invention. FIG. 3 illustrates the components of the ACS 200, including those components that may not be located within the module 205. As described below, these components may be part of the first conditioning circuit 255, and/or the second conditioning circuit 280. The first conditioning circuit 255 may represent the ACS 200 operating in a direct evaporative cooling mode. Here, the first conditioning circuit may comprise: the non-chilled fluid supply 240; the non-media conditioning system 230; the media conditioning system 260; the collection tank 250; the fluid return 245, which may connected to a pump 270; a first valve 290, which may comprise a three-way valve; and a third valve 300. The first conditioning circuit 255 may also comprise a make-up fluid supply 305 and a make-up supply valve 310, which may collectively operate to replenish the first conditioning circuit 255 of the fluid consumed during the evaporative process.

The second conditioning circuit 280 may represent the ACS 200 operating in a direct chilling mode. The second conditioning circuit 280 may comprise: the chilled fluid supply 265; the non-media conditioning system 230, the media conditioning system 260; the collection tank 250; the fluid return 245; the pump 270; the first valve 290; the source 285; the second valve 295; and the third valve 300.

In use, the ACS 200 may comprise at least two operating modes: an evaporative cooling mode that may primarily use the first conditioning circuit 255, and the chilling mode that may primarily use the second conditioning circuit 280. As discussed, an embodiment of the ACS 200 may provide the flexibility of operating in either an evaporative system mode or a chilling system mode. Here, if the fluids supplied to the non-media conditioning system 230 and to the media conditioning system 260 are greater than the dew point temperature, then the ACS 200 may function as an evaporative cooling system. Similarly, if the fluids supplied to the non-media conditioning system 230 and to the media conditioning system 260 are less than the dew point temperature, then the ACS 200 may function as a chilling system.

The following discussion provides an operational overview of an embodiment of the ACS 200. Here, the discussed embodiment includes a fluid distribution pad 215. Other embodiments of the ACS 200, not comprising the fluid distribution pad 215, may follow similar operational steps.

Operation of the ACS 200 in the evaporative cooling mode may comprise the following, non-limiting, steps. The non-media conditioning system 230, and the media conditioning system 260, portions of which may be within the module 205, may nearly simultaneously receive the fluid via the header 275, which may be supplied from the non-chilled fluid supply 240. Next, as the airstream flows through the module 205, the spray nozzles 235 may spray the airstream with the fluid. Next, as the airstream flows downstream, the fluid distribution pad 215 may distribute fluid directly on the airstream now flowing through the direct exchange medium 220. Next, portions of the fluid may drain to the collection tank 250.

Then, the fluid return 245 may deliver some of the fluid within the collection tank 250 to an inlet of a pump 270. Furthermore, the make-up fluid supply 305 and the make-up supply valve 310 may operate to supply make-up fluid to the inlet of the pump 270. Next, an outlet of the pump 270 may move the fluid toward the first valve 290. In the three-way valve form, the first valve 290 may allow for the fluid from the pump 270 to flow within the first conditioning circuit 255.

After the airstream flows by the non-media conditioning system 230 and the direct exchange medium 220, the airstream may then flow downstream to the mist eliminator 225. Concurrently, the make-up fluid supply 305 may provide make-up fluid via the make-up supply valve 310 to the first conditioning circuit 255. As discussed, the make-up fluid generally serves to replenish the fluid consumed during the evaporation process.

In an embodiment of the present invention the first conditioning circuit 255 may allow for the fluid to spray the airstream from vertical and horizontal directions. Here, the third valve 300 may be opened when the first conditioning circuit 255 is in operation.

Operation of the chilling mode may comprise the following, non-limiting steps. The non-media conditioning system 230, and the media conditioning system 260, portions of which may be within the module 205, may nearly simultaneously receive the fluid via the header 275, which may be supplied from the chilled fluid supply 265. Next, as the airstream flows through the module 205, the spray nozzles 235 may spray the airstream with the fluid. Next, the fluid distribution pad 215 may allow for the fluid to engage the airstream flowing through the direct exchange medium 220. Next, portions of the fluid may drain into the collection tank 250. Next, the fluid return 245 may deliver some of the fluid within the collection tank 250 to an inlet of a pump 270. Next, an outlet of the pump 270 may move the fluid toward the first valve 290. Here, the first valve 290 may allow for the fluid from the pump 270 to flow within the second conditioning circuit 280. A source 285 may also provide fluid to the second conditioning circuit 285, if additional fluid is required. The source 285 may comprise any supply capable of delivering the required flowrate and pressure of the fluid. For example, but not limiting of, the source 285 may comprise at least one of: a thermal storage system, a storage tank, a cooling fluid system, or the like. After the airstream flows by the direct exchange medium 220, the airstream may then flow downstream to the mist eliminator 225.

In an embodiment of the present invention, a flowrate of the fluid flowing through the nozzles maybe increased to perform a cleaning function on components of the ACS 200. This feature may help to maintain an operational efficiency and effectiveness of the ACS 200. For example, but not limiting of, the cleaning function may clean the direct exchange medium 220.

As described, embodiments of the present invention provide a user a plurality of benefits and advantages over known systems. An embodiment of the present invention may provide broader applications and usage for direct exchange medium 220 usages in air conditioning systems 200. Depending on the temperature levels the conditioning of the airstream may occur via: a) a pure evaporation process, where the fluid temperature is greater than or equal to the airstream wet-bulb temperature; or b) in the chilling process where the fluid temperature is substantially lower than the airstream wet-bulb temperature. Embodiments of the present invention may provide the flexibility of controlling the extent of the conditioning by regulating the temperature of the fluid An embodiment of the present invention may add more flexibility to the gas turbine operational economics by providing the choices of direct evaporative cooling and direct chilling during power generation. An embodiment of the present invention may offer improved cost-effectiveness relative to the known chiller coil units, reduced packaging costs, the lower pressure drops, and other structural benefits.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for conditioning an airstream entering an air-breathing machine, the system comprising:
    an airstream filter disposed in an air filter housing for removing foreign objects and debris from the airstream; and
    an air conditioning system (ACS) disposed downstream of the airstream filter and configured for adjusting a physical property of the airstream entering the air-breathing machine, wherein the air conditioning system comprises a module, and wherein the module comprises:
        a non-media conditioning system located downstream of an inlet filter house and configured for adjusting a physical property of the airstream;
        wherein the non-media conditioning system comprises nozzles adapted for spraying a fluid onto the airstream to precondition the airstream that has previously been filtered by the airstream filter at an upstream location of the non-media conditioning system;
        a media conditioning system configured for adjusting a physical property of the airstream to provide additional output of the air-breathing machine, the airstream preconditioned by the non-media conditioning system for providing relatively uniform temperature distribution of the airstream throughout a direct exchange medium; wherein the media conditioning system comprises: the direct exchange medium, and a fluid distribution manifold; and
        a fluid distribution pad located above the direct exchange medium, the fluid distribution manifold located above the fluid distribution pad;
    wherein if a temperature of the fluid supplied to the non-media conditioning system and to the media conditioning system is approximately greater than a dew point temperature of the airstream, then the ACS operates in a direct evaporative mode; and wherein if the temperature of the fluid supplied to the non-media conditioning system and to the media conditioning system is approximately less than the dew point temperature of the airstream, then the ACS operates in a direct chilling mode.

2. The system of claim 1, wherein the module of the air conditioning system is located within an inlet system of the air-breathing machine, wherein the inlet system comprises at least one of:
    a weather hood;
    a transition piece;
    an inlet duct; and
    an inlet bleed heat section.

3. The system of claim 1, wherein a first conditioning circuit comprises:
    a non-chilled supply configured for dispersing the fluid to the nozzles, the fluid distribution manifold, a fluid distribution pad, and the direct exchange medium; and a tank for collecting portions of the fluid dispersed.

4. The system of claim 1, wherein a second conditioning circuit comprises: a chilled fluid supply configured for delivering the fluid from a source to the nozzles, the fluid distribution manifold, a fluid distribution pad and a fluid return for delivering a portion of the fluid dispersed by the nozzles, fluid distribution manifold and the fluid distribution pad to a tank.

5. The system of claim 1, wherein the direct exchange medium is formed of a material comprising at least one of: a plastic, a nylon, a carbon fiber, a cellulose, a synthetic polymer, a metal, or combinations thereof.

6. The system of claim 1, wherein a system pressure of the fluid exiting the nozzles of the non-media conditioning system comprises less than about 150 pounds per square inch.

7. The system of claim 6, wherein a nozzle size of each of the nozzles comprises a range of from about 0.1 inches to about 0.25 inches.

8. The system of claim 4, wherein the fluid comprises water, a coolant, or combinations thereof, and the source comprises at least one of: a thermal storage system, storage tank, and a cooling water system.

9. The system of claim 1, wherein a flowrate of the fluid flowing through the nozzles is increased to perform a cleaning function on at least one component of the ACS.

10. A system for increasing an output of an energy producing facility comprising an air-breathing machine, the system comprising:
a gas turbine comprising an inlet system, wherein the inlet system comprises at least one of: a weather hood, an inlet filter house, a transition piece, an inlet duct, and an inlet bleed heat section;
an airstream filter disposed in the inlet system for removing foreign objects and debris from an airstream; and
an air conditioning system (ACS) configured for adjusting a physical property of an airstream entering the gas turbine, wherein the air conditioning system comprises a plurality of modules, and wherein each module comprises:
a non-media conditioning system located downstream of the inlet filter house and configured for adjusting a physical property of the airstream,
wherein the non-media conditioning system comprises nozzles configured for spraying a fluid onto the airstream to precondition the airstream that has previously been filtered by the airstream filter at an upstream location of the non-media conditioning system;
a media conditioning system configured for adjusting a physical property of the airstream if additional output of the air-breathing machine is desired, wherein the airstream is preconditioned by the non-media conditioning system for providing relatively uniform temperature distribution of the airstream throughout a direct exchange medium;
wherein the media conditioning system comprises: the direct exchange medium, and a fluid distribution manifold; and
a fluid distribution pad located above the direct exchange medium, the fluid distribution manifold located above the fluid distribution pad.

11. The system of claim 10, wherein an operating mode of the ACS comprises at least one of: a direct evaporative mode, wherein a first conditioning circuit supplies the fluid that flows through the nozzles and the fluid that flows through the fluid distribution manifold, a fluid distribution pad, and the direct exchange medium, wherein the fluid engages the airstream flowing through ACS; a direct chilling mode, wherein a second conditioning circuit supplies the fluid that flows through the nozzles and the fluid that flows through the fluid distribution manifold, the fluid distribution pad, and the direct exchange medium, wherein the fluid engages the airstream flowing through the ACS; and
wherein if a temperature of the fluid supplied to the non-media conditioning system and to the media conditioning system is approximately greater than the dew point temperature of the airstream, then the ACS operates in the direct evaporative mode; and wherein if the temperature of the fluid supplied to the non-media conditioning system and to the media conditioning system is approximately less than the dew point temperature of the airstream, then the ACS operates in the direct chilling mode.

12. The system of claim 10, wherein a first conditioning circuit comprises: a non-chilled supply configured for dispersing the fluid to the nozzles, the fluid distribution manifold, a fluid distribution pad, and the direct exchange medium; and a tank for collecting portions of the fluid dispersed.

13. The system of claim 10, wherein a second conditioning circuit comprises: a chilled fluid supply configured for delivering the fluid to the nozzles, and to the fluid distribution manifold; and a fluid return for returning a portion of the fluid delivered.

14. The system of claim 10, wherein the direct exchange medium is formed of a material comprising at least one of: a plastic, a nylon, a carbon fiber, a cellulose, a synthetic polymer, a metal, or combinations thereof.

15. The system of claim 10, wherein a system pressure of the fluid exiting the nozzles of the non-media conditioning system comprises less than about 150 pounds per square inch.

16. The system of claim 15, wherein a nozzle size of each of the nozzles comprises a range of from about 0.1 inches to about 0.25 inches.

17. The system of claim 13, wherein the inlet system comprises a plurality of modules located downstream of the inlet filter house.

18. The system of claim 10, wherein a flowrate of the fluid flowing through the nozzles is increased to clean a component of the ACS.

* * * * *